March 5, 1957     A. ABGARIAN     2,784,005
FOLDABLE WHEELED GOLF BAG CARRIER

Filed Nov. 30, 1953     2 Sheets-Sheet 1

INVENTOR.
ARAM ABGARIAN
BY
ATTORNEYS.

March 5, 1957
A. ABGARIAN
2,784,005
FOLDABLE WHEELED GOLF BAG CARRIER
Filed Nov. 30, 1953
2 Sheets-Sheet 2
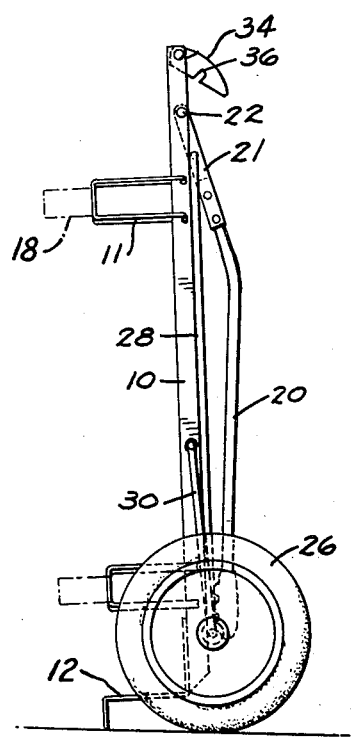
Fig. 4
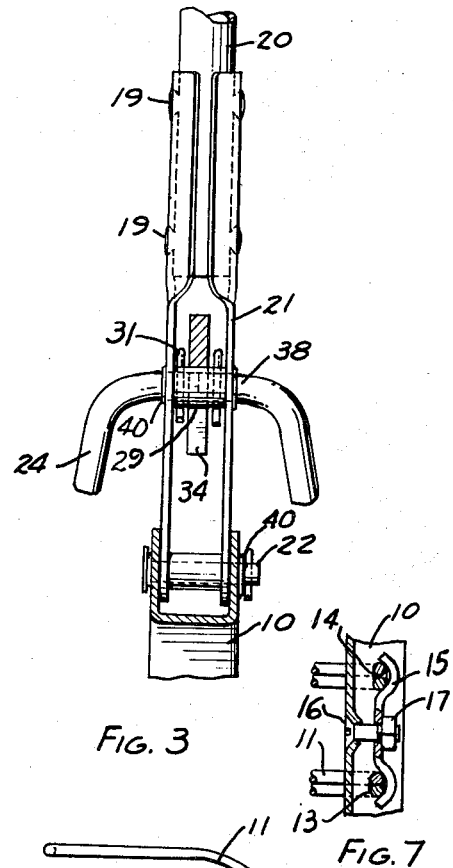
Fig. 3
Fig. 7
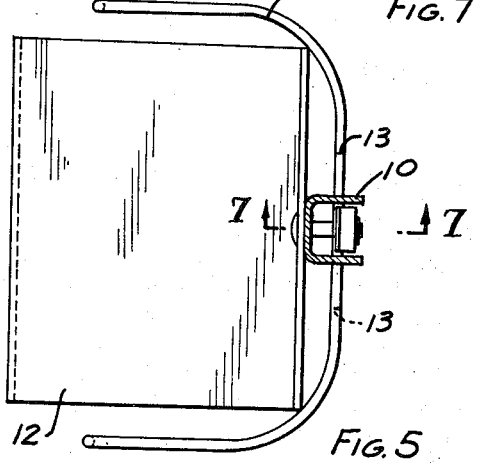
Fig. 5
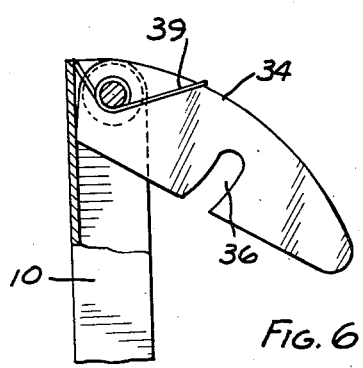
Fig. 6
INVENTOR.
ARAM ABGARIAN
BY
Barnes, Kisselle, Laughlin & Raisch
ATTORNEYS.

United States Patent Office 2,784,005
Patented Mar. 5, 1957

2,784,005

FOLDABLE WHEELED GOLF BAG CARRIER

Aram Abgarian, Detroit, Mich.

Application November 30, 1953, Serial No. 394,952

5 Claims. (Cl. 280—41)

This invention relates to a golf bag carrier.

It is an object of this invention to provide a golf bag carrier which is of simple construction, of economical manufacture, and which can be collapsed from a stable operative position into a very compact size for storage.

In the drawings:

Fig. 3 is a sectional view along the line 3—3 of Fig. 1.

Fig. 4 is a side elevation of the carrier in the collapsed condition.

Fig. 5 is a sectional view along the line 5—5 of Fig. 1.

Fig. 6 is a fragmentary detail view of the latch provided for locking the carrier in the operating condition.

Fig. 7 is a fragmentary detail view of the connection between the golf bag brackets and the frame of the carrier.

Figure 1:
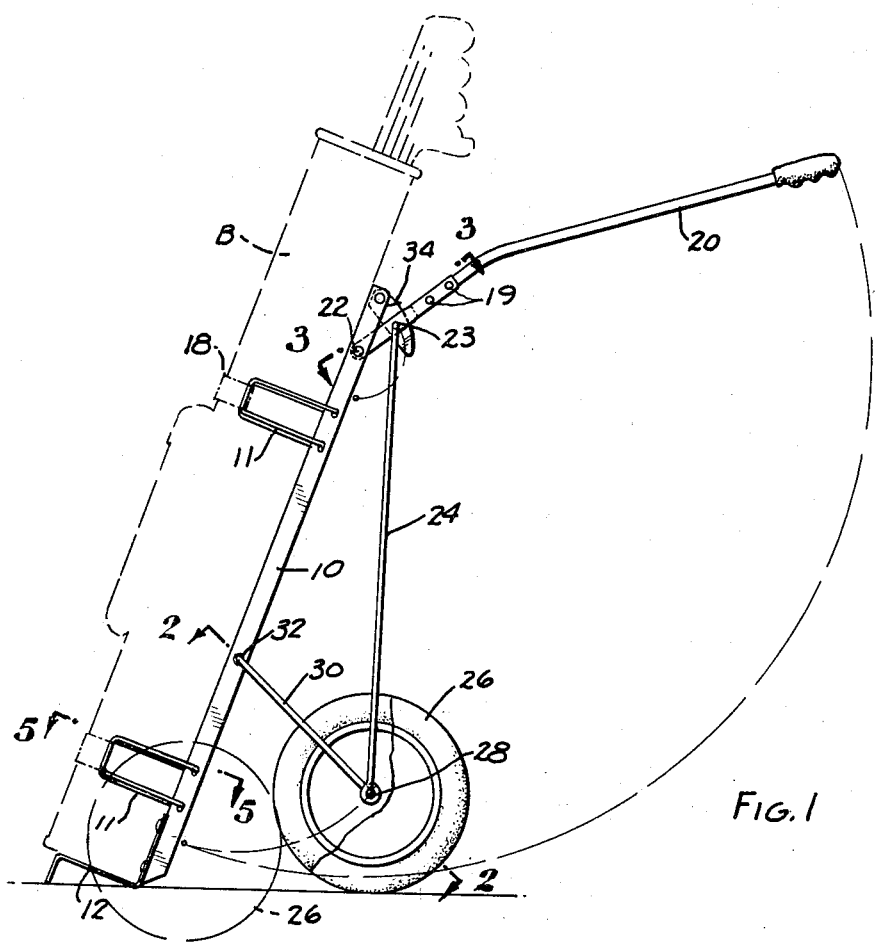
Fig. 1 is a side elevation partly in section of the golf bag carrier of this invention.

Referring more particularly to the drawings, the carrier, as is shown in Fig. 1, includes an upright support 10 which is preferably in the form of a channel member. Support 10 is provided with two sets of vertically spaced wire brackets 11 which cooperate with the channel 10 and a base plate 12 at the lower end of channel 10 to provide a frame for retaining a golf bag on the carrier. Brackets 11 are arranged in pairs and each is arcuately shaped with its free ends 13 extending through aligned elongated openings 14 in the side walls of channel 10. A clamp 15 disposed within channel 10 is arranged to be brought into clamping engagement with the ends of brackets 11 by means of a screw 16 and nut 17. The brackets 11 may be extended or retracted towards each other by simply loosening screw 17 with a screw driver and then manually shifting each bracket to the desired position. Straps, such as indicated at 18, may be provided for securing the golf bag, generally designated B, on the carrier. The upright support 10 is provided with a tubular handle 20 at its upper end. Handle 20 is pivoted on support 10 as at 22. At its inner end handle 20 is bifurcated as by the provision of projecting straps 21 which are welded as at 19 to the handle. At the bifurcated portion handle 20 pivotally supports, as at 23, the bight portion of a frame 24 which is of generally inverted V shape. At the lower ends of the legs of frame 24 there is journalled a pair of wheels 26 on an axle 28. A second generally V-shaped frame 30 has its bight portion pivotally connected with support 10 as at 32, the lower ends of the legs of frame 30 being pivotally connected with axle 28 between the ends of frame 24. From the standpoint of ease of manufacture, it is preferred to fashion each of these V-shaped frames as two half sections which are secured together at the bight portions of the frame by bushings 29 into which are slipped the adjacent ends of the frames and retained therein by cotter pins 31.

A latch 34 is pivoted at the upper end of upright 10 and is provided with a slot 36 which, in the operative position of the carrier, is arranged to engage with the bight portion 38 of frame 24, that is, the bushing 29 between straps 21. A torsion spring 39 biases latch 34 downwardly to the position shown in Fig. 1.

It will be observed that the portion of handle 20 between the pivotal connection 22 and 23 provides a link and the frame 30 provides a link by means of which links the support 10 is shiftably supported on frame member 24. If it is desired to collapse the carrier from the operative position shown in Fig. 1, latch 34 is pivoted upwardly out of engagement with the bight portion 38 of frame 24. The handle then may be pivoted downwardly about the bight portion 38. This will cause the upright 10 to swing upwardly and in a direction toward the frame 24 to a position where, when the handle 20 is generally vertically disposed, the support 24 and the frame 30 are in more or less nested position, as is shown in Fig. 4. Obviously, if the carrier is in the collapsed condition and it is desired to assemble it into the operative condition, the handle 20 is pivoted upwardly to the position shown in Fig. 1 and the parts are automatically locked in this position by reason of latch 34 snapping into engagement with the bight portion 38 of frame 24. It will be observed that in the operative upright position shown in Fig. 1, frame 24 extends generally vertically and support 10 inclines upwardly toward support 10 with its lower end resting on the ground surface, thus providing a very stable carrier which may be readily moved about on wheels 26.

Figure 2:
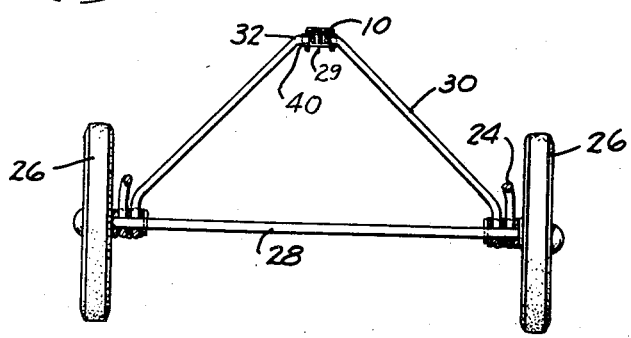
Fig. 2 is a sectional view along the line 2—2 of Fig. 1.

In order to reduce the weight of the cart and thus use thinner stock for the channel 10 and straps 21 without impairing in any way the strength of the cart, I have found that it is desirable to extrude the openings in the straps 21 and the channel support 10 at the pivotal connections. Thus, as is best shown in Figs. 2 and 3, these openings are formed as extrusions 40 which increase the rigidity of the members and, at the same time, provide a wider bearing surface for the rods or pins which extend through these openings.

Thus, it will be seen that I have provided a golf bag carrier which is of very simple construction and which is designed for economical manufacture. Furthermore, the carrier can be collapsed simply by releasing the latch 34 and pivoting the handle 20 downwardly about the pivotal connection 23. When in the collapsed position, the carrier may be set up into the operative position by simply pivoting handle 20 upwardly to a position where latch 34 snaps into engagement with the bight portion of frame 24.

I claim:

1. A golf bag carrier comprising, an upright frame of generally inverted V shape having wheels journalled at the free ends of the legs of the frame, a second generally V-shaped frame having the free ends of its legs pivotally connected with the legs of the first frame adjacent the lower ends thereof, a third frame on which a golf bag is arranged to be supported, said second frame having a pivotal connection at the bight portion thereof with said third frame, a link pivotally connected at one end with the bight portion of said first frame and with the upper end portion of said third frame at its opposite end, said link and said second frame being dimensioned and arranged such that when they are pivoted upwardly on said first frame, said third frame is shifted from an operative position spaced from and inclined to the first frame to an inoperative position wherein the third frame is nested with the first frame, a latch for locking said frames in said operative position, and a handle member forming an extension of said link, said handle projecting from the pivotal connection between said link and said first frame, said third frame being generally channel-shaped in cross section, said second V-shaped frame being formed as two half sections which are connected at the bight portion of the V, the ends of said half sections at said bight portions each extending through one of the side walls of said channel shaped frame in diametrically opposed relation, and a sleeve member telescopically arranged over said last mentioned ends of said half sections and extending transversely between said side walls.

2. The combination set forth in claim 1 including means connecting said sleeve with said ends of said half sections to prevent withdrawal of said ends from said sleeve.

3. A golf bag carrier comprising, an upright frame of generally inverted V shape having wheels journalled at the free ends of the legs of the frame, a second generally V-shaped frame having the free ends of its legs pivotally connected with the legs of the first frame adjacent the lower ends thereof, a third frame on which a golf bag is arranged to be supported, said second frame having a pivotal connection at the bight portion thereof with said third frame, a link pivotally connected at one end with the bight portion of said first frame and with the upper end portion of said third frame at its opposite end, said link and said second frame being dimensioned and arranged such that when they are pivoted upwardly on said first frame, said third frame is shifted from an operative position spaced from and inclined to the first frame to an inoperative position wherein the third frame is nested with the first frame, a latch for locking said frames in said operative position, and a handle member on one of said frames forming an extension of said link, said third frame having spaced apart wall portions with registering apertures therein, said second V-shaped frame being formed as two half sections which are connected at the bight portion of the V, the ends of said half sections at said bight portion each extending through said registering apertures in diametrically opposed relation and a sleeve member telescopically arranged over said last mentioned ends of the half sections and extending transversely between said wall portions.

4. A golf bag carrier comprising an upright frame of generally inverted V shape, the free ends of the legs of said frame being formed with registering apertures, a second generally V-shaped frame having the free ends of its legs formed with registering apertures coaxially aligned with the apertures at the free ends of said first V-shaped frame, an axle passing through said registering apertures of the two frames so that the two frames are pivotally supported by the axle, a pair of ground engaging wheels journalled on said axle, a third frame on which a golf bag is arranged to be supported, said third frame having an opening therein through which the bight portion of said second frame extends and is journalled, a handle member pivotally connected at one end thereof with said third frame adjacent the upper end of the third frame, said handle member having an opening therethrough spaced from the pivotal connection with said third frame, the bight portion of said first V-shaped frame extending through said last mentioned opening and journalled therein for pivotal movement, the portion of said handle between its pivotal connection with said third frame and the opening through which said first frame extends forming a link which is dimensioned and arranged such that when said handle is shifted downwardly at its free end, said third frame and second frame are shifted from an operative position spaced from and inclined to the first frame to an inoperative position wherein the third frame is nested with the first frame and a latch for locking said frames in said operative position.

5. The combination set forth in claim 4 wherein said handle is bifurcated at the portion thereof through which said opening extends, said latch being pivotally supported by said first frame and adapted to engage the bight portion of said first frame in said bifurcation to lock said frames in said operative position.

References Cited in the file of this patent

UNITED STATES PATENTS

| | | |
|---|---|---|
| 2,007,709 | Eppens | July 9, 1935 |
| 2,415,392 | Morehouse | Feb. 4, 1947 |
| 2,475,454 | Merrill | July 5, 1949 |
| 2,626,814 | Chamberlin | Jan. 27, 1953 |
| 2,658,771 | Rutledge | Nov. 10, 1953 |

FOREIGN PATENTS

| | | |
|---|---|---|
| 658,596 | Great Britain | Oct. 10, 1951 |